Dec. 23, 1958 L. TSCHIRF ET AL 2,865,198
HARDNESS TESTING APPARATUS
Filed July 6, 1954
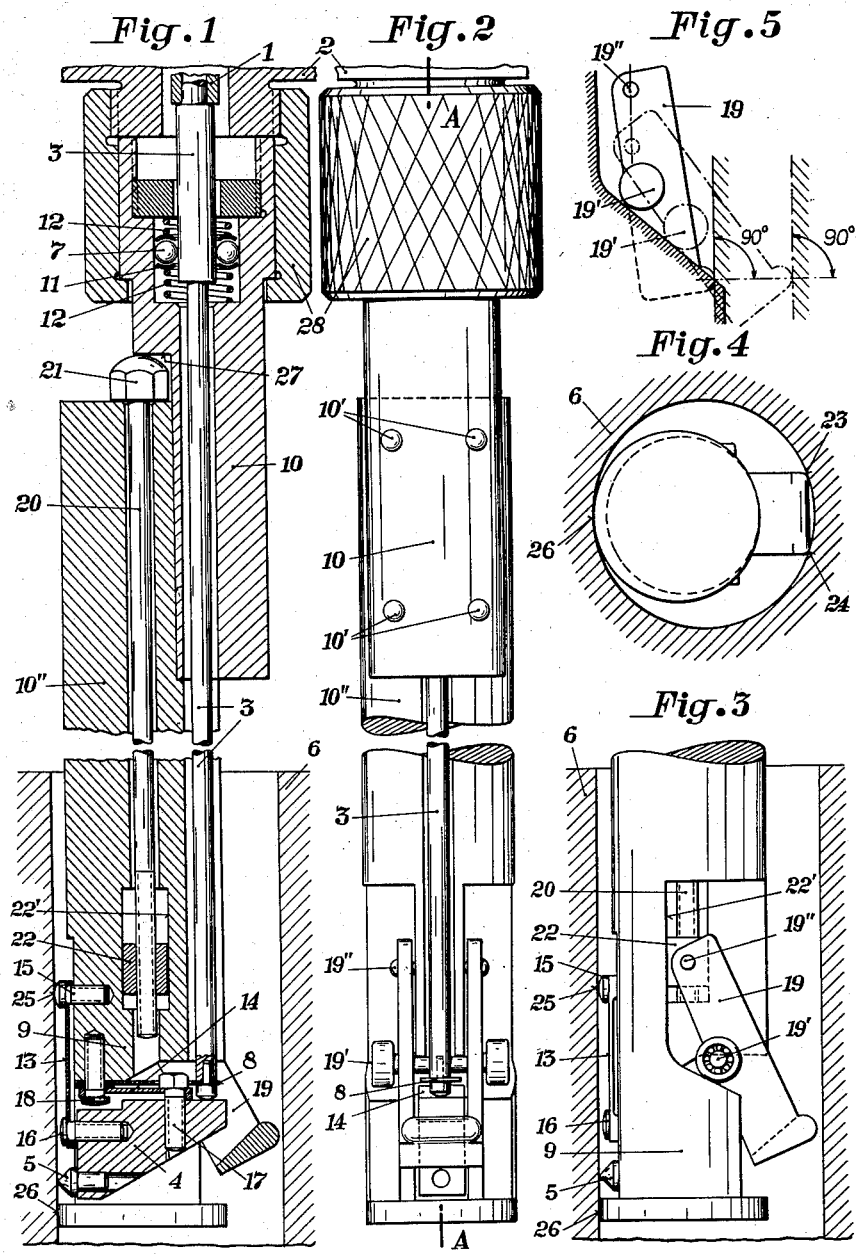
INVENTOR
LUDWIG TSCHIRF
FRITZ GÄRTNER
BY
ATTORNEYS

United States Patent Office 2,865,198
Patented Dec. 23, 1958

2,865,198

HARDNESS TESTING APPARATUS

Ludwig Tschirf and Fritz Gärtner, Vienna, Austria

Application July 6, 1954, Serial No. 441,446

Claims priority, application Austria July 9, 1953

10 Claims. (Cl. 73—81)

This invention relates to hardness testing apparatus and has as its main object to provide apparatus for testing the hardness of surfaces difficult to reach.

More particularly it is an object of the invention to provide apparatus for testing the hardness of the inside surfaces of tubular bodies, inside cones, internal threads, parallel plane internal surfaces, teeth, and the like.

The previously known static inside hardness testers enable hardness tests to be carried out only on inside surfaces relatively close to the point where the hardness tester is attached. They comprise one or several levers, which are introduced in the general direction of the tube axis into the interior of the tube to be tested, and serve either for loading only or for loading and depth measurement. Due to the fact that these levers are subjected to bending stress and in order to provide a good force transmission ratio these levers can be designed only up to a certain limited length (German Patent No. 623,171 and French Patent No. 55,639).

For measuring the inside width of bores, tubes and the like, inside calipers or micrometers have been developed in which the measuring stroke which takes place in the direction of the bore or tube axis is deflected to a radial direction close to the point to be tested (U. S. Patent No. 1,048,073).

Conventional hardness testing methods require a very accurate control of the load applied to the indenter, and further require the indenter to be held firmly opposite the point tested. Furthermore, it is essential that the indenting force be transmitted only to the point tested and that the measurement of the penetration be independent of other influences.

These requirements cannot be fulfilled by the mere adaptation of the deflection feature of inside calipers or micrometers to hardness testing apparatus.

It is an additional specific object of the invention to combine in a hardness tester the aforesaid deflection feature and means for holding the indenter in position relative to the point to be tested so as to provide a hardness tester fulfilling the aforedescribed requirements.

It is another feature of the invention to provide apparatus for hardness testing with an indenter for indenting a surface to be tested, which comprises chucking means connected to said indenting head and operable to chuck said head relative to said surface in a position in which said predetermined direction is normal to said surface, and means for applying to said chucking means a chucking force independent of and exceeding said indenting force.

The invention will hereinafter be described more fully with reference to the accompanying drawings illustrating apparatus embodying the above and other features of the invention.

Fig. 1 is a sectional elevation view of the apparatus as an attachment to a hardness tester, with the specimen to be tested, taken along line A—A of Fig. 2, Fig. 2 is a side elevation of the attachment, without the specimen, Fig. 3 is an elevation view of the indenting head in the test specimen and parts of the chucking device, Fig. 4 is a plan view of the device according to Fig. 3, seen from below, and Fig. 5 is a diagrammatic view illustrating the guidance of the fulcrum of the chucking lever.

In the embodiment shown in the drawings the loading forces are transmitted through the plunger 1 of the hardness tester 2, which may be stationary or portable, to the transmitting member 3, whereby they are transmitted through a means for converting it from the direction in which it is originally transmitted into a predetermined different direction, here a spring pivot 4 to the indenter 5.

The movement of the indenter 5 into the tubular specimen 6 due to said loading forces is transmitted through the said spring pivot 4 and the same rod 3 to the plunger 1 of the hardness tester, in which they are tested or measured in the usual manner.

Guidance for the rod 3 is provided at the upper end by anti-friction bearing members permitting reciprocating movement, at its lower end by a leaf spring 8 fixed to the testing head 9. The testing head 9 forms the end member of a carrying structure for the indenter 5, which structure is connected to the hardness tester 2 and comprises an upper member 10 for connection to the tester, and an elongated carrying member 10" connected by rivets 10' to the member 10.

The balls 7 of the anti-friction bearing are held in a cage 11, which is provided with means in the form of cylindrical coil springs 12 arranged to prevent the cage from being displaced axially to such an extent that a pure rolling motion is no longer possible, when the rod 3 is moved farther. Such displacement might otherwise be caused by an inclination of the bearing and the presence of a bearing clearance.

The means for converting the direction of the testing force in the form of a spring pivot 4 comprises a prismatic pivot block (Fig. 1), which is held by a cross spring blade link having leaf springs 13, 14 arranged transversely of each other in T-configuration and which faces the test specimen 6 with an arm to which the indenter 5 is firmly connected. Screws 15, 16 and 17, 18 respectively connect the leaf springs 13, 14 to the testing head 9 and the pivot block 4. To reduce the area of frictional and sliding contact between head and springs, and thus to avoid permanent length alterations of the springs, the springs have small heads. According to the invention the springs are held by the screws 15—18 or other supporting parts only in positive locking engagement therewith. The spring end portions held by the screws are thicker than their reduced intermediate parts. This feature reduces on the one hand the pressure per unit area in the bores of the springs, and on the other hand ensures good resiliency.

The means for converting the direction of the testing force described has the advantage that it is free of any external friction. The springs are dimensioned for superimposing movements on the otherwise arcuate movement of the point of the indenter so as to cause the point to move substantially along a straight line normal to the surface to be tested.

The transmission ratio is selected so that the loading force exercised by the plunger 1 of the hardness tester 2 is smaller than the loading force effective at the indenter, whereas the penetrating movement is amplified as it is transmitted back to the plunger. This feature serves to reduce the elastic deformations. Whereas it leads to an increase of any deviation of the load applied by the hardness tester, it will proportionately reduce any inaccuracy of the depth gauge of the device. This constitutes an advantage because the permissible load deviations usually have a smaller effect on the hardness value measured than the permissible errors of measurement.

To prevent the testing head 9 from being lifted from or displaced relative to the surface to be tested, a chucking means is provided for chucking the head against said surface. In the illustrated embodiment the chucking means comprises a two-armed lever 19 (Fig. 1), whose fulcrum 19' is adjustable along a cam relative to the testing head 9 in such a manner that upon a predetermined movement of its inner arm 19" the engaging points 23, 24 of its outer arm move at right angles to the supporting surface opposite to the surface to be tested (Figure 5). In the present form, the cam is integral with testing head 9. This feature serves to avoid damage to the test specimen and displacement of the point of application of the indenter such as might be caused by a movement of the two engaging points relative to the supporting surface, e. g. when the latter yields to the engaging pressure (Figs. 3 and 5).

As shown in the drawing the predetermined movement of the inner lever arm may be effected by the headed bolt 20 and the associated nut 22 travelling along a straight guide 22' of the testing head 9. The hexagon head 21 of bolt 20 engages the upper end face of the carrying member 10" and a step 27 of the upper member 10 to enable the chucking means to be operated at this point.

The chucking means is designed to follow any yielding movement of the test specimen resiliently without appreciable loss of chucking force. This can be achieved by the selection of an appropriate material, by suitable dimensions, or by the interposition of a resilient member at any point of the path through which the chucking force is transmitted. Further the chucking device is constructed to engage the test specimen with four engaging points 23, 24, 25, 26 to hold the testing head centrally in the bore of test specimen 6 and prevent an inclination of the carrying member 10". The four engaging points are suitably arranged as illustrated so that an imaginary line connecting two of said points, viz. the two points 23, 24 of the lever 19 (Fig. 4) is at right angles to the axis of the carrying member 10 whereas the other two engaging points 25, 26 lie on the same side as the indenter on a straight line extending longitudinally of said axis. The engaging point 25 is formed by the head of the fixing screw 15. Therefore, if the test surface is conical, the two last-mentioned engaging points lie on a generatrix thereof. In the illustrated embodiment, with a tubular test specimen, the line connecting the points 25, 26 is parallel to the axis of carrying member 10.

A cap nut 28 connects the carrying structure 10, 10" to the casing of the hardness tester 2 to establish a closed power transmitting system in the apparatus. Thus the indenter is subjected to no forces other than a loading force component (indenting force) directed at right angles to the surface to be tested. This arrangement eliminates the need for a rigid external connection between the test specimen and the hardness tester and for a chucking force whose frictional component exceeds the loading force exercised by the hardness tester. Where the novel apparatus is to be used without a usual hardness tester, the loading force may be applied simply by weighting the rod 3, if a sufficient chucking force is provided.

The cam shown in Figs. 3 and 5 may also be formed on the lever 19 in which case the fulcrum is provided on the indenting head 9.

The balls 7 of the anti-friction bearing serving to guide the rod 3 may be held centrally by magnet poles arranged inside and/or outside the ball bearing.

From the foregoing description and the drawings it is apparent that the penetrating movement of the indenter 5 is transmitted by transmitting member 3 in the same direction in which the loading power was transmitted by said transmitting member. It is further apparent that if the surface to be tested is one which surrounds a hollow space, e. g., the bore of tube 6, the power is transmitted from outside that space into said space and the penetrating movement is transmitted to and measured outside said space, and the chucking force is applied inside said space.

It is also apparent that the means for converting the direction of the testing force is spring-pivotally connected to the indenting head by two leaf springs 13, 14, which have relatively thick portions connected by positive locking engagement to said deriving means and testing head, respectively, and relatively thin intermediate portions.

In addition, it has been described and shown that the chucking means comprise a lever 19 having an outer arm formed with two engaging points 23, 24 thereon and an inner arm 19", a fulcrum 19' for said lever intermediate said arms, a cam in engagement with said fulcrum and formed to cause the engaging points 23, 24 to move along a straight line in a predetermined direction upon predetermined movement of the inner arm 19" causing a turning of lever 19 about its fulcrum 19' and an adjustment of said fulcrum along said cam, and that the means for applying said chucking force comprise a bolt 20 and nut 22 connected to said inner arm to cause such predetermined movement thereof.

In the illustrated embodiment, the means 4 for converting the direction of the testing force is operatively connected to the indenter 5 to move the same and be moved by it in the predetermined direction in which the indenter is movable relative to the testing head 9, and the power transmitting means comprising the rod 3 is connected to said means to transmit force thereto in a direction transverse to said predetermined direction. The transmitting and force converting means (3, 4) constitute a transmission which is adapted to convert a given force acting through a given displacement of the transmitting means 3 into a stronger force acting through a smaller displacement of the indenter 5 and to convert a given movement of the indenter into a larger movement of the transmitting means.

The previous disclosure has also shown that the invention can be embodied in apparatus for use with a hardness tester comprising a casing 2, a power source 1, and, if desired, a measuring means, such as a dial indicator (not shown), which may be connected to the plunger 1 and that this apparatus may comprise means 10, 10" for connecting the testing head 9 to the stationary structure 2 and an operative connection between the transmitting means 3 to the power source 1 and any measuring means that may be connected thereto.

The foregoing specification and drawings further disclose a transmitting member 3 reciprocable to transmit said power and movement to and from said force converting means, a limited guide surface for guiding said transmitting member to reciprocate along a straight line, transverse anti-friction bearing members 7 interposed between said transmitting member and guide surface, and means 12 for yieldingly holding said bearing members in equilibrium at intermediate points of said guide surface. Said guide surface for the transmitting member is formed at the end of the carrying structure 10, 10" which is opposite to the end to which the indenting head 9 is connected.

What we claim is:

1. Apparatus for testing the hardness of one of two opposed spaced surfaces, comprising a testing head, power transmitting means on said head for transmitting power acting in a first predetermined direction, an indenter carried by said testing head for movement relative thereto in a second predetermined direction transverse to said first predetermined direction, a cross spring blade link including a block carrying said indenter and engaged by said power transmitting means, and two leaf springs arranged transversely to each other, each of said springs having one end connected to said testing head and another end connected to said block for converting power transmitted by said transmitting means in said first predetermined direction into an indenting force acting on said indenter in said second predetermined direction, chucking means connected to said testing head and operable for chucking said head between said two surfaces in a position in which said second predetermined direction is normal to said one surface, and means connected to said chucking means and operable for exercising thereon a chucking force independent of and exceeding the indenting force.

2. Apparatus as claimed in claim 1 in which each of said leaf springs has two relatively thick ends and a relatively thin intermediate portion.

3. Apparatus as claimed in claim 1, in which each of said leaf springs is connected to said block and testing head by positive locking engagement.

4. Apparatus for testing the hardness of one of two opposed spaced surfaces, comprising a testing head, mechanical power transmitting means on said head movable in a first predetermined direction to transmit a force in said direction, an indenter carried by said testing head for movement relative thereto in a second predetermined direction transverse to said first predetermined direction, means mechanically connecting said indenter and said transmitting means for converting a force transmitted by said transmitting means in said predetermined direction into an indenting force acting on said indenter in said second predetermined direction, and for converting a movement of said indenter in said second predetermined direction into a movement of said transmitting means in said first predetermined direction, chucking means connected to said testing head for chucking said head between said two surfaces in a position in which said second predetermined direction is normal to said one surface, and means connected to said chucking means for exercising thereon a chucking force independent of and exceeding said indenting force.

5. Apparatus as claimed in claim 4 in which said power transmitting means comprise a reciprocable transmitting member for transmitting said force and movement, and a carrying structure having said testing head at one end thereof and having a limited guide surface at the other end guiding said transmitting member for reciprocation along a straight line, transverse anti-friction bearing members interposed between said transmitting member and guide surface, and means carried by said carrying structure for yieldingly holding said bearing members in equilibrium at intermediate points of said guide surface.

6. A chucking device for use between opposed spaced surfaces, comprising a head carrying on one side a pair of engaging points for engagement with one of said surfaces, an operating member movable relative to said head, a lever carried by said head and having an inner arm connected to said operating member for movement in a predetermined direction and an outer arm carrying on the other side of said head a second pair of engaging points for engagement with the other of said surfaces, a fulcrum for said lever intermediate said arms, and a cam in engagement with said fulcrum, said fulcrum being carried on one of said two parts consisting of said lever and said head and said cam being carried on the other of said parts and having a profile causing said second pair of engaging points to move relative to said first pair of engaging points along a straight line in a predetermined direction normal to an imaginary line connecting said first pair of engaging points on movement of said inner arm by said operating member, whereby said lever is turned about said fulcrum and said fulcrum is adjusted along said cam, the second pair of engaging points lying on an imaginary line which extends crosswise of said imaginary line connecting said first pair of engaging points.

7. Apparatus for testing the hardness of one of two opposed spaced surfaces, comprising a testing head, power transmitting means on said head movable in a first predetermined direction for transmitting a force in said direction, an indenter carried by said testing head for movement relative thereto in a second predetermined direction transverse to said first predetermined direction, means connecting said indenter and said transmitting means for converting a force transmitted by said transmitting means and acting through a given displacement of said transmitting means in said predetermined direction into a stronger indenting force acting on said indenter through a smaller displacement thereof in said second predetermined direction and for converting a movement of said indenter in said second predetermined direction into a larger movement of said transmitting means in said first predetermined direction, chucking means connected to said testing head for chucking said head between said two surfaces in a position in which said second predetermined direction is normal to said one surface, and means connected to said chucking means for exercising thereon a chucking force independent of and exceeding said indenting force.

8. Apparatus for testing the hardness of one of two opposed spaced surfaces, comprising a testing head, power transmitting means on said head for transmitting power acting in a first predetermined direction, an indenter carried by said testing head for movement relative thereto in a second predetermined direction transverse to said first predetermined direction, means connecting said indenter and said transmitting means for converting power transmitted by said transmitting means in said first predetermined direction into an indenting force acting on said indenter in said second predetermined direction, chucking means comprising two pairs of engaging points carried by said testing head, said pairs of points lying on opposite sides of the testing head and the engaging points of each pair being disposed on opposite sides of the indentor said chucking means being operable for chucking said head between said two surfaces in a position in which said second predetermined direction is normal to said one surface, and means connected to said chucking means and operable for exercising thereon a chucking force independent of and exceeding the indenting force.

9. Apparatus for testing the hardness of one of two opposed spaced surfaces, comprising a testing head, power transmitting means on said head for transmitting power acting in a first predetermined direction, an indenter carried by said testing head for movement relative thereto in a second predetermined direction transverse to said first predetermined direction, means connecting said indenter and said transmitting means for converting power transmitted by said transmitting means in said first predetermined direction into an indenting force acting on said indenter in said second predetermined direction, chucking means comprising two pairs of engaging points carried by said testing head, said pairs of points lying on opposite sides of the testing head on imaginary lines extending crosswise of each other and the engaging points of each pair being disposed on opposite sides of the indenter, said chucking means being operable for chucking said head between said two surfaces in a position in which said second predetermined direction is normal to said one surface, and means connected to said chucking means and operable for exercising thereon a chucking force independent of and exceeding the indenting force.

10. Apparatus for testing the hardness of one of two opposed spaced surfaces, comprising a testing head, power transmitting means on said head for transmitting power acting in a first predetermined direction, and indenter carried by said testing head for movement relative thereto in a second predetermined direction transverse to said first predetermined direction, means connecting said indenter and said transmitting means for converting power transmitted by said transmitting means in said first predetermined direction into an indenting force acting on said indenter in said second predetermined direction, chucking means comprising a lever having an outer arm with two engaging points thereon, said points disposed on opposite sides of the indenter, said lever also having an inner arm, said chucking means further comprising a fulcrum for said lever intermediate said arms, a cam in engagement with said fulcrum and having a profile causing said engaging points to move along a straight line in a predetermined direction upon movement of said inner arm in a predetermined direction turning said lever about said fulcrum and movement of said fulcrum along said cam, operable for chucking said head between said two surfaces in a position in which said second predetermined direction is normal to said one surface, and means connected to said chucking means and operable for exercising thereon a chucking force independent of and exceeding the indenting force comprising means connected to said inner arm for moving said inner arm, said fulcrum being carried by one of the two parts consisting of the testing head and said lever and said cam being carried on the other of said parts.

References Cited in the file of this patent

UNITED STATES PATENTS

| | | |
|---|---|---|
| 278,910 | Emery | June 5, 1883 |
| 2,233,403 | Dickinson | Mar. 4, 1941 |
| 2,448,486 | Chester | Aug. 31, 1948 |

FOREIGN PATENTS

| | | |
|---|---|---|
| 540,806 | Germany | Dec. 30, 1931 |
| 664,215 | Germany | Aug. 23, 1938 |
| 431,855 | Italy | Mar. 8, 1948 |
| 845,425 | Germany | July 31, 1952 |
| 859,970 | Germany | Dec. 18, 1952 |